(12) United States Patent
Lindoff et al.

(10) Patent No.: US 10,863,565 B2
(45) Date of Patent: Dec. 8, 2020

(54) COMMUNICATION DEVICE AND METHOD THEREIN FOR CONNECTION MANAGEMENT IN WIRELESS COMMUNICATION NETWORK

(71) Applicant: Telefonaktiebolaget LM Ericsson (publ), Stockholm (SE)

(72) Inventors: Bengt Lindoff, Bjärred (SE); Magnus Åström, Lund (SE); Joakim Axmon, Limhamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 59 days.

(21) Appl. No.: 16/310,935

(22) PCT Filed: Jun. 28, 2016

(86) PCT No.: PCT/EP2016/064991
§ 371 (c)(1),
(2) Date: Dec. 18, 2018

(87) PCT Pub. No.: WO2018/001459
PCT Pub. Date: Jan. 4, 2018

(65) Prior Publication Data
US 2020/0084814 A1 Mar. 12, 2020

(51) Int. Cl.
*H04W 76/15* (2018.01)
*H04W 76/27* (2018.01)
(Continued)

(52) U.S. Cl.
CPC .......... *H04W 76/15* (2018.02); *H04W 8/183* (2013.01); *H04W 60/005* (2013.01);
(Continued)

(58) Field of Classification Search
CPC ..... H04W 76/15; H04W 76/27; H04W 8/183; H04W 60/005; H04W 64/00; H04W 88/06; H04W 76/36; H04L 67/1097
See application file for complete search history.

(56) References Cited

U.S. PATENT DOCUMENTS

2011/0117962 A1\* 5/2011 Qiu ........................ H04W 48/18
455/558
2011/0151832 A1\* 6/2011 Lai ......................... H04M 15/00
455/407

(Continued)

FOREIGN PATENT DOCUMENTS

EP          3022951 B1   10/2016
WO      2016095980 A1    6/2016

*Primary Examiner* — Kiet Tang
(74) *Attorney, Agent, or Firm* — Murphy, Bilak & Homiller, PLLC (57) ABSTRACT

A wireless communication device (140) and method therein for managing connection states in a wireless communication system (100) are disclosed. The wireless communication device (140) comprises at least two Subscriber Identity Modules, SIMs, in which a first SIM is associated to a first original connection state towards a first network node (111), a second SIM is associated to a second original connection state towards a second network node (121). The wireless communication device (140) obtains a position of the wireless communication device (140) and determines a priority list for the at least two SIMs based on the obtained position. The wireless communication device (140) further determines whether the respective connection states of the first and second SIMs have conflicting needs in radio resources. When the respective connection states of the first and second SIMs have conflicting needs in radio resources, the wireless communication device (140) performs a connection state change for the SIM that has lower priority from its original connection state to a third connection state.

19 Claims, 3 Drawing Sheets

(51) Int. Cl.
*H04W 8/18* (2009.01)
*H04W 60/00* (2009.01)
*H04W 64/00* (2009.01)
*H04W 88/06* (2009.01)

(52) U.S. Cl.
CPC .......... *H04W 64/00* (2013.01); *H04W 76/27* (2018.02); *H04W 88/06* (2013.01)

(56) References Cited

U.S. PATENT DOCUMENTS

| | | | |
|---|---|---|---|
| 2012/0034917 A1* | 2/2012 | Kazmi | H04W 48/16 455/434 |
| 2014/0155119 A1* | 6/2014 | Bishop | H04W 52/28 455/552.1 |
| 2014/0171038 A1 | 6/2014 | Singvall et al. | |
| 2015/0023258 A1 | 1/2015 | Hu et al. | |
| 2015/0382178 A1* | 12/2015 | Park | H04W 8/183 455/411 |
| 2016/0191227 A1* | 6/2016 | Pagano | H04B 1/40 370/281 |
| 2016/0227557 A1* | 8/2016 | Fanous | H04W 72/10 |

\* cited by examiner

COMMUNICATION DEVICE AND METHOD THEREIN FOR CONNECTION MANAGEMENT IN WIRELESS COMMUNICATION NETWORK

TECHNICAL FIELD

Embodiments herein relate to a wireless communication device which comprises multiple Subscriber Identity Modules, SIMs and a method therein. In particular, they relate to prioritization and connection management of the multiple SIMs in the wireless communication device based on a position of the wireless communication device.

BACKGROUND

Wireless communication devices may be referred to as mobile telephones, user equipments (UE), wireless terminals, mobile terminals, mobile stations, cellular telephones, smart phones, laptops, tablets and phablets, i.e. a combination of a smartphone and a tablet with wireless capability. Wireless communication devices are enabled to communicate or operate wirelessly in a wireless communication system comprising multiple networks or Heterogeneous Networks (HetNet) with access nodes or access points. The heterogeneous networks may comprise, e.g. a cellular communications network comprising Second/Third Generation (2G/3G) network, such as Global System for Mobile Communications (GSM), Wideband Code Division Multiple Access (WCDMA) or High Speed Packet Access (HSPA) etc., 3G Long Term Evolution (LTE) network, Worldwide interoperability for Microwave Access (WiMAX) network, Wireless Local Area Network (WLAN) or WiFi etc. for proving different type of radio access technologies (RATs). A wireless communications network may cover a geographical area which is divided into cells or cover areas, wherein each cell is served by a network node, which may also be referred to as a serving network node, an access node, an access point or a base station, e.g. eNodeB (eNB) or NodeB.

The development of new generations of cellular systems simultaneously with upgrading existing generations allows for a wider range of accessible networks and RATs. In an environment where e.g., both LTE and HSPA co-exist, data rates for the two RATs are comparable. Furthermore, both LTE and HSPA allow for multi carrier signalling. In LTE this capability is denoted as Carrier Aggregation (CA), allowing for up to five LTE carriers to be aggregated, whereas in HSPA it is denoted as Multi Carrier (MC), allowing for up to eight HSPA carriers to be aggregated.

Further, specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. This will provide more accessible networks and RATs.

An arising scenario today is multiple Subscriber Identity Modules (SIMs) devices, such as UEs may carry two or more SIMs from a single or multiple operators in the same device. Particularly in Asia this has become de facto standard, although it has not been standardized by the 3rd Generation Partnership Project (3GPP). On many markets it is hard to get operator approval and volumes for a mid-end device without the capability of supporting at minimum Dual SIM Dual Standby (DSDS). The capability of supporting DSDS allows a UE to camp on two cells simultaneously, or be connected to one cell and camp on another cell. In case both SIMs are from the same operator, the UE may occasionally camp on the same cell but with two different identities and associated paging occasions. In order to qualify for high-end device approval, it is generally required to support Dual SIM Dual Activity (DSDA), whereby the UE can be independently connected towards two cells simultaneously.

The popularity of DSDS/DSDA devices on Asian markets depends on several factors. One factor may be that operators have different price plans e.g. for data and voice, or may have different price plans depending on calling subscribers in same or other network. Other factors may be, e.g. different coverage by different operators, i.e. spotty coverage, or that a mobile phone number cannot move between operators. The trend is towards to support even more than two SIMs simultaneously, and UEs with support for three and four SIMs, Triple SIM, Triple Standby (TSTS) and Quad SIM Quad Standby (QSQS) have been announced by some UE vendors.

For DSDA UEs in active mode, it is required for the UE to use separate receivers for each connection, since it e.g. may use a Packet Switched (PS) service simultaneously for both SIMs, or may use PS service for one and a Circuit Switched (CS) service for the other. Therefore to support DSDS/DSDA, TSTS/QSQS and different RATs, the wireless communication devices usually comprise multiple receiving paths.

Moreover multi-antenna UEs have been introduced in LTE network. Although not explicitly stated, requirements that were defined for Evolved Universal Terrestrial Radio Access (E-UTRA) in the 3GPP LTE specification Release 8 were impossible to pass without two antennas. In parallel, UEs with dual antennas were introduced also in the previous generation of cellular systems, such as in WCDMA.

3GPP's Radio Access Network Working Group 4 (RAN 4) is responsible for defining the requirements for transmission and reception parameters, channel demodulation and radio resource management. Although the functionality of up to eight Multi-input Multi-output (MIMO) streams has been specified in 3GPP RAN 1 since Release 10, it is not until the ongoing Release 13 that the work on the requirements specification was instigated for up to 4 MIMO streams.

Four downlink receive antennas (DL 4 RX) increases the spatial diversity allowing for more parallel streams to be transmitted when conditions allow, or for the UE to being able to cancel out interferers while receiving data allowing for higher modulation orders or code rates although not necessarily using more parallel layers. All in all this will result in significantly higher data rates compared to a standard DL 2 RX UE. Future UEs may very well be equipped with even more antennas, in particular considering the increased carrier frequencies that are being introduced in future standards, allowing for smaller but more antennas on the same space.

MIMO allows multiple layers to be transmitted in parallel streams over the same physical time-frequency resource. The number of parallel streams are, however, limited to the lesser number of the number of transmit antennas and the number of receive antennas. Quite often, in practice the number of streams is even less than that. The actual value depending on several factors such as radio propagation environment, as well as the antenna design of both the eNB and the UE.

For improving the performance of wireless communication devices with multiple SIMs and multiple antennas and receiving paths, it is desirable to handle the operating modes and schedule the connections of the multiple SIMs to the networks. One of present solutions for scheduling between multiple SIMs in e.g. a dual-SIM UE, is to share the existing RX chains or paths. However, the receiving paths are typically a limiting resource in the sense that full functionality with multiple antennas for several connected SIMs at the same time is typically not possible. Hence in case both SIMs request high activity connection, a control unit in the wireless communication device needs to prioritize the limited resources. In some prior art solutions one of the SIMs have a hard coded priority, while in other prior art approaches a random SIM is getting prioritized. These priority methods may be not optimum for some use case scenarios where one of the SIMs may have higher priority than other SIMs, and therefore may cause problems for the SIM which is not prioritized and its connection may be interrupted undesirably.

SUMMARY

It is therefore an object of embodiments herein to provide an improved prioritization method and connection management for a wireless communication device with multiple SIMs and multiple receiving paths in a wireless communication system.

According to a first aspect of embodiments herein, the object is achieved by a method performed in a wireless communication device for managing connection states in a wireless communication system. The wireless communication device comprises at least two Subscriber Identity Modules, SIMs, in which a first SIM is associated to a first original connection state towards a first network node, a second SIM is associated to a second original connection state towards a second network node. The wireless communication device first obtains a position of the wireless communication device. Then the wireless communication device determines a priority list for the at least two SIMs based on the obtained position. The wireless communication device further determines whether the respective connection states of the first and second SIMs have conflicting needs in radio resources. When the respective connection states of the first and second SIMs have conflicting needs in radio resources, the wireless communication device performs a connection state change for the SIM that has lower priority from its original connection state to a third connection state.

According to a second aspect of embodiments herein, the object is achieved by a wireless communication device for managing connection states in a wireless communication system. The wireless communication device comprises at least two Subscriber Identity Modules, SIMs, in which a first SIM is associated to a first original connection state towards a first network node, a second SIM is associated to a second original connection state towards a second network node. The wireless communication device is configured to obtain a position of the wireless communication device. The wireless communication device is further configured to determine a priority list for the at least two SIMs based on the obtained position. The wireless communication device is further configured to determine whether the respective connection states of the first and second SIMs have conflicting needs in radio resources. When the respective connection states of the first and second SIMs have conflicting needs in radio resources, the wireless communication device is configured to perform a connection state change for the SIM that has lower priority from its original connection state to a third connection state.

According to the embodiments herein, the prioritization of SIMs is made based on the position of the wireless communication device in case two or all SIMs request the limited radio resources at the same time. The position may be in time and/or space, so the SIM has a natural priority, e.g. a SIM with an office subscription is at office during office hours, or a SIM with a private subscription during non-office hours, may get the highest priority. Then the connection states s of the SIMs are managed based on the determined priority. The connection state associated to non-prioritized SIMs may be forced to change to a third state, e.g. a lower active state, idle state or detached state etc. In this way, an automatic prioritization of SIMs based on time and/or localization of the wireless communication device is achieved. This improves user experience with less need of manual parameter settings or priority list settings.

Therefore, the embodiments herein provide an improved wireless communication device and method therein for prioritizing and managing connections and operations for all supported SIMs and an optimized management of radio resources in the wireless communication device.

BRIEF DESCRIPTION OF THE DRAWINGS

Examples of embodiments will be described in more detail with reference to attached drawings in which.

DETAILED DESCRIPTION

Figure 1:
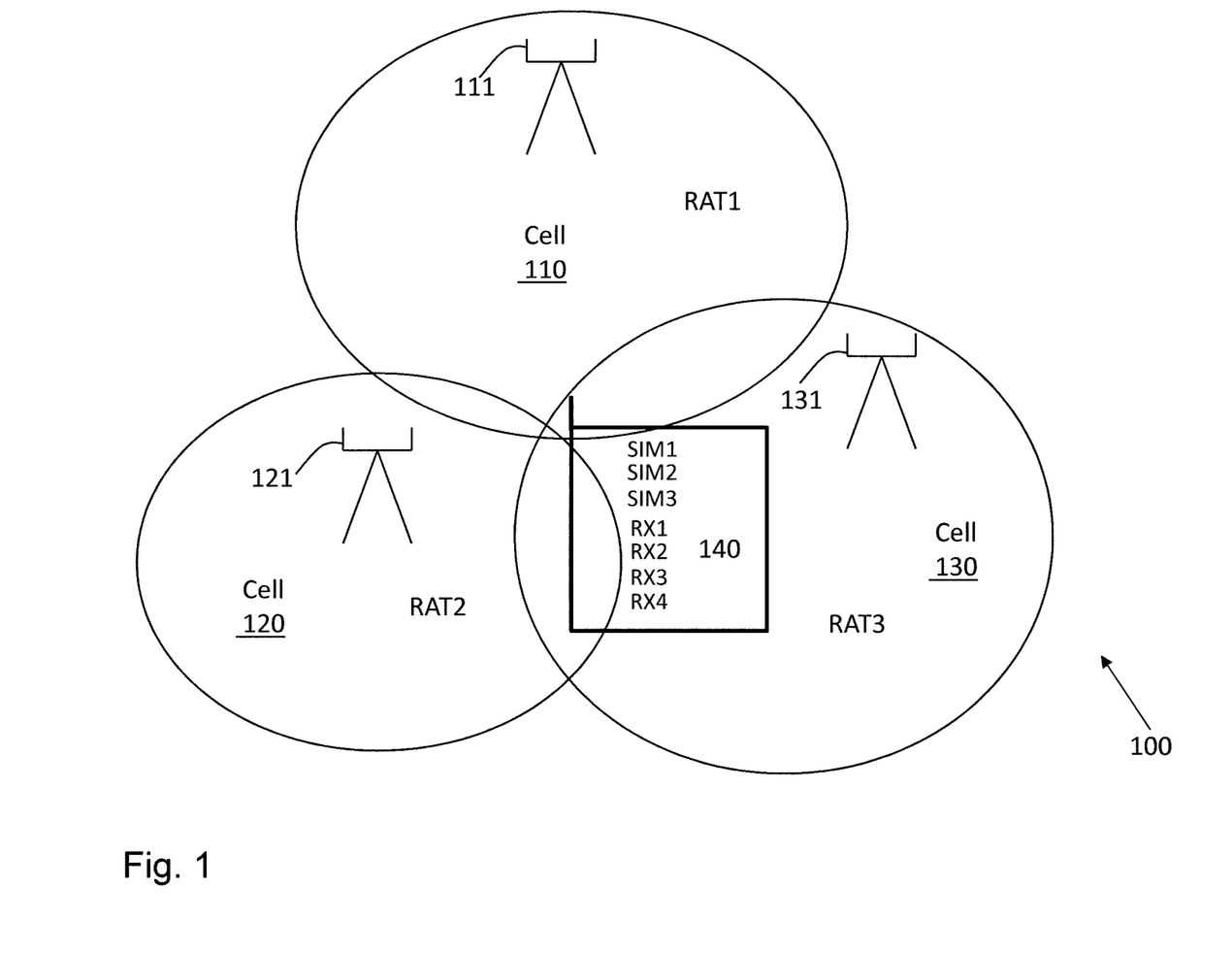
FIG. 1 is a schematic block diagram illustrating embodiments of a wireless communication system.

FIG. 1 depicts an example of a wireless communication system 100 in which embodiments herein may be implemented. The wireless communication system 100 may comprise one or more wireless communication networks such as e.g. any 2G, 3G, 4G or LTE, 5G networks, Wimax, WLAN or WiFi, Bluetooth, sensor networks etc. for providing different RATs.

Each wireless communication network may cover a geographical area which is divided into cells or coverage areas. Each cell area is served by a network node operating in the respective wireless communication network. One network node may serve several cells. In FIG. 1, three network nodes are shown, network node 111, network node 121, and network node 131. The term network node as used herein may also be referred to as a serving network node, an access node, an access point or a base station. Therefore the wireless communication system 100 may comprise a number of network nodes serving cells with RATs which may be different, and support communications for a number of wireless communication devices located therein. The network node 111 serves a cell 110 and provides a first RAT, RAT1, the network node 121 serves a cell 120 and provides a second RAT, RAT2, and the network node 131 serves a cell 130 and provides a third RAT, RAT3. The RAT1, RAT2 and RAT3 may be same or different RATs, e.g. LTE, WCDMA/HSPA, GSM or Enhanced Data GSM Evolution (EDGE) etc.

A number of wireless communication devices operate in the wireless communication system 100, whereof one, a wireless communication device 140, is shown in FIG. 1.

The wireless communication device 140 may be, e.g. a mobile terminal or station, a wireless terminal, a user equipment, a mobile phone, a computer such as e.g. a laptop, a Personal Digital Assistants (PDAs) or a tablet computer etc. The wireless communication device 140 comprises at least two SIMs, whereof the wireless communication device 140 shown in FIG. 1 comprises SIM1, SIM2, SIM3. The at least two SIMs may belong to different operators, e.g. which may provide different subscriptions, or provide different RATs or use different spectrum, i.e. different carrier frequencies, in different coverage areas or cells, e.g. in cities or countryside. Further, the service subscriptions of the two or more SIMs may differ, such as one SIM may provide an all-exclusive service whereas the other may provide only fundamental past generation service. The at least two SIMs may also associate to different subscriptions, e.g. an office or job subscription, a private subscription etc.

The wireless communication device 140 comprises multiple radio receiving paths, whereof the wireless communication device 140 shown in FIG. 1 comprises e.g. four radio receiving paths RX1, RX2, RX3, RX4. A radio receiving path converts received RF signals to baseband signals, and it may comprise e.g. band selective filters, low noise amplifier, mixer, analog to digital converter etc. The wireless communication device 140 may have multiple antennas and capability of MIMO. The multiple radio receiving paths may have its own antenna.

In order to optimally utilize the spectrum, the wireless communication device 140 reports Channel State Information (CSI) to the network node 111, 121, 131 and the network node 111, 121, 131 will base subsequent transmissions on the reported CSI. CSI typically includes a channel quality indicator (CQI) representing certain setups of the modulation and coding scheme (MCS), a precoding matrix indicator (PMI) representing the preferred precoding matrix, and a rank indicator (RI) representing the number of parallel spatial streams that the wireless communication device 140 can resolve. CQI and PMI may be conditioned on a certain rank. Further CQI and RI may be adjusted to a higher value in order to influence link adaption to increase data rates faster following an interrupt.

Figure 2:
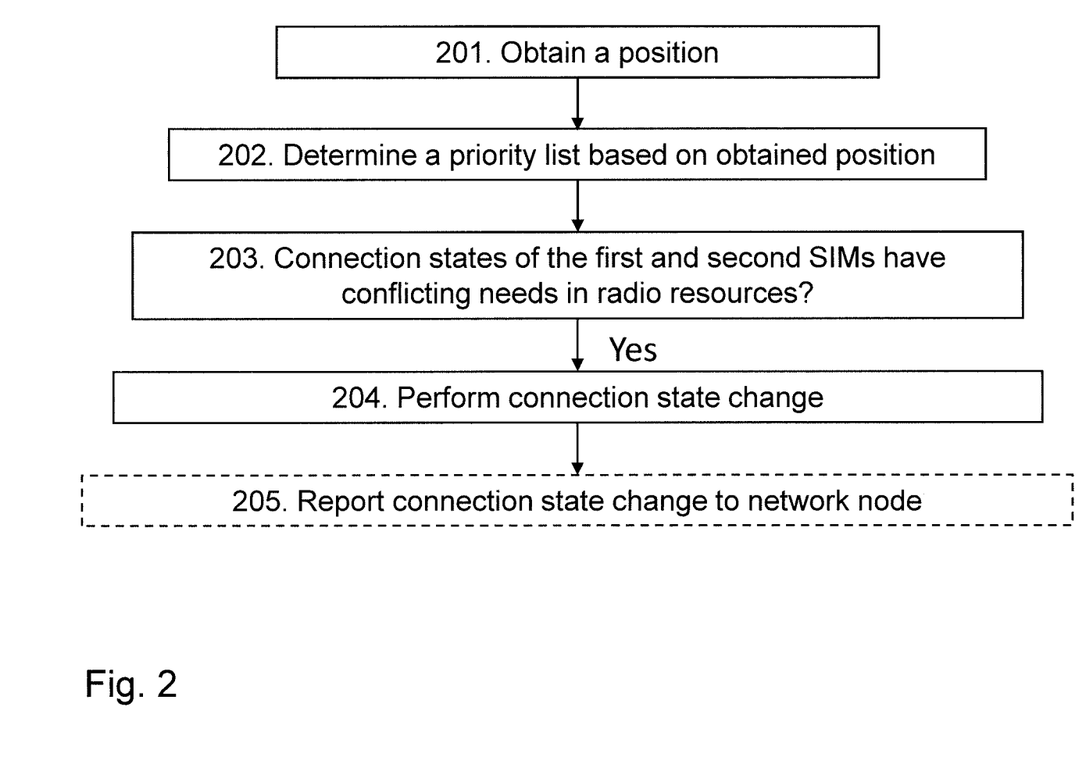
FIG. 2 is a flowchart illustrating embodiments of a method in a wireless communication device.

Example embodiments of a method performed in the wireless communication device 140 for managing connection states in the wireless communication system 100 will now be described with reference to FIG. 2. The wireless communication device 140 comprises multiple receiving paths or branches RX1, RX2, RX3, RX4 and at least two SIMs, a first and second SIM SIM1 and SIM2. The first SIM is associated to a first original connection state towards the first network node 111. The second SIM is associated to a second original connection state towards the second network node 121. The respective SIM may be associated to different subscriptions, for example one SIM may be associated with an office or job subscription and another SIM may be associated with a private subscription. Some SIMs may have subscriptions associated to the same operator or to different operators. For example, the first network node 111 may be same as the second network node 121. According to the embodiments herein, the method comprises the following actions, which actions may be taken in any suitable order.

Action 201

In order to prioritize and manage connection states of the multiple SIMs and improve the performance of the wireless communication device 140 for the respective SIMs based on its localization and time, the wireless communication device 140 needs to obtain a position of the wireless communication device 140. The wireless communication device 140 obtains at regular basis its position. The position may be a position in space, i.e. a geographical localization or position. The position may be a position in time, e.g. day time, office hours, weekend, during night etc. In some embodiments it may be both in time and space, e.g. at office during day time, at home outside office hours etc. The wireless communication device 140 may obtain its position based on a geographical position determined, for instance by Global Navigation Satellite System (GNSS), Global Position System (GPS), cellular/wireless Network assisted-GPS, i.e. A-GPS or by sensor networks. In other embodiments, the wireless communication device 140 may obtain its position based on a geographical position determined by a proximity detection by a proximity sensor, where the proximity here is a detection of certain beacons or sync signals transmitted from specific access points (AP) via low power wireless communication system, like Bluetooth low energy or WLAN.

The wireless communication device 140 may also obtain its position in space based on a position of its serving network node in a cellular network of the wireless communication system 100, or based on a position derived from triangulation using several network nodes.

Action 202

Once the position is obtained, the wireless communication device 140 determines a priority list for the at least two SIMs based on the obtained position. The priority list may be determined beforehand and stored as a look-up table in the wireless communication device 140. In other embodiments, the priority list may be stored in a cloud and an over-the-top application may report the position, using one of the SIM connection, to a server in the cloud and the server reports to the wireless communication device 140 the priority of SIMs at the current position.

Typical examples of SIM prioritizations, depending on a type of subscription in combination with the localization and time, may be at least one or a combination of:

The SIM associated with a job subscription may have higher priority during office hours;

The SIM associated with a job subscription may have higher priority when the wireless communication device 140 is at office position;

The SIM associated with a job subscription may have higher priority when the wireless communication device is at a position other than home position;

The SIM associated with a private subscription may have higher priority when the wireless communication device 140 is at home position;

The SIM associated with a private subscription may have higher priority when the wireless communication device 140 is at a position other than work position;

The SIM associated with a private subscription may have higher priority during non-office hours;

The SIM associated with a local subscription may have higher priority within one network area, whereas the SIM associated with a roaming subscription may have higher priority within another network area.

These are some examples of use case scenarios where one of the SIMs has a natural prioritization. Some other rules may be used when the wireless communication device 140 determines a priority list for the at least two SIMs based on the obtained position.

Action 203

In order to manage connection states of the SIMs and to know if prioritization is needed, the wireless communication device 140 determines whether the respective connection states of the first and second SIMs have conflicting needs in radio resources. This may be done by a control unit in the wireless communication device 140 which continuously monitors the radio resource need for the connections associated to the respective SIMs in order to see whether there is a risk for radio resource conflicts. The radio resources may comprise receiver branches or paths, digital processing units or dedicated hardware blocks, e.g. hardware accelerators, decoders or Fast Fourier transforms (FFTs). They are limited radio resources in the wireless communication device 140. For example, a number of receiving paths needed for a connection state associated with a SIM is determined based on the type of the connection, the RAT and radio link conditions associated with the SIM towards its network node.

Action 204

When the respective connection states of the first and second SIMs have conflicting needs in radio resources, for example, both SIMs are in active mode and request full use of RX branches RX1, RX2, RX3, RX4 and hence a total of 8 RX is requested while only 4 RX exists, prioritization is needed and one of the SIM has to change its connection state. The wireless communication device 140 performs a connection state change for the SIM that has lower priority from its original connection state to a third connection state.

A connection state change may be any one of:
a. from a higher active state to a lower active state. For example, RRC_connected (Radio Resource Control) in LTE, Cell_DCH (Dedicated Channel) in WCDMA/HSPA are higher active states, and Cell_FACH in WCDMA/HSPA is a lower active state which needs less radio resources.
b. from an active state to an idle state. In an idle state, the wireless communication device only occasionally monitors paging and does mobility management and therefore takes less radio resources.
c. from an active state to a dormant state. Dormant state is a condition of a network or device in which it is inactive but prepared to receive a new service request.
d. from an idle state to a detached state. If a SIM is in a detached state, it may be not connected or registered to a network node. It may also occasionally attach or connect to the network node to poll received text, date and/or multimedia messages and the alike. For example, the detached SIM may attach and register to the network periodically, e.g. every 10 minutes or sparser to poll for text and multimedia messages e.g. carrying information on missed calls and/or voice messages etc. A detached state takes less radio resources than an idle state does.
e. from a connection state that needs a full set of receive branches to a connection state that needs a subset of receive branches. For examples, an active state may need 4 RXs, while an idle mode may only require one RX in HSPA or 2 RXs in LTE. Further, a connection state with inter-band Carrier Aggregation will require more RXs than a connection state with intra-band CA or no CA capability at all.

Further, a third connection state may be any one of:
i. A state with a de-activated component carrier. In carrier aggregation, a wireless communication device may be ordered to activate or deactivate component carriers. A component carrier typically need a new RX branch, or wider RX filters which takes radio resources. So a state with a de-activated component carrier releases some radio resources.
ii. A state with a reduced MIMO capability. Reduced MIMO capability will release some receiver branches.
iii. A state using a less complex receiver type. For example, a less advanced receiver is allocated to a low priority SIM in order to provide a more advanced receiver to the higher priority SIM.
iv. A state using reduced number of iterations in iterative receivers. For example, in a Codeword-level SIC (CWIC) receiver in LTE, a state using reduced number of iterations will release some resources in digital processing units or dedicated hardware blocks.

The connection state change may be triggered by transmitting a request to the serving node of the SIM that has lower priority or triggered by the wireless communication device 140. In the case where the connection state of the SIM that has lower priority is changed from idle mode to a detached state, the wireless communication device 140 informs the corresponding network node that it is going to turn off the connection prior to actual detach.

According to some embodiments herein, the connection state change may be a change of RAT. In case the the wireless communication device 140 has detected other RATs on other carrier frequencies, e.g. detected via well-known Inter RAT (IRAT) measurements or by autonomous search. The wireless communication device 140 may choose one of the detected RATs which uses less radio resources, and the connection for the SIM that has lower priority may be changed to use this RAT.

According to some embodiments herein, more than one SIMs may be selected to perform a connection state change according to the priority list for the SIMs. For example, if 3 SIMs are in a connection state at the same time, and a state change for one of the SIM is not enough to release necessary radio resources for the SIM has the highest priority, another SIM which has lower priority may be selected to perform a state change to release more radio resources.

Action 205

The wireless communication device 140 may report a connection state change of the connection associated with the SIM to its associated network node. This may be done by a CSI report. For example, SIM1 is performing CSI reporting at regular intervals to the first network node 111. The CSI may include RANK information with the maximum reported rank conditioned on the number of allocated RX paths to SIM1. It may be assumed that a full rank reporting is performed, i.e., requiring all 4 RX paths when it is in the original connection state. After a state change, the wireless communication device 140 starts to report CSI based on only two RX paths instead of four for SIM1. For example a maximum RANK of 2, i.e. only 2 MIMO layers can be transmitted on the connection associated with SIM1. This is in order for the network node 111 not to allocate number of MIMO layers more than what the wireless communication device 140 can handle for SIM1. In order for the connection state change to be performed in a secure manner, a Radio Resource Control (RRC) signaling to the network node associated to the SIM may be performed.

To summarize, the method according to embodiments herein provides an improved prioritization and connection management for a wireless communication device 140 with multiple SIMs. A prioritization is made for the multiple SIMs based on the position of the wireless communication device 140 when connections associated with the respective SIMs require limited radio resources at the same time. The connections associated to non-prioritized SIMs may be forced to a lower active state, idle state, detached state or a dormant state. A restricted set of RX branches including antennas may be allocated to the connection associated to the non-prioritized SIMs. The position may be time, localization or both time and localization. In this way, it allows for automatic prioritization of the multiple SIMs based on time and localization of the wireless communication device 140. Further the SIM which has a natural priority, e.g. a SIM with an office subscription at office during office hours, or a SIM with a private subscription during non-office hours, may get the highest priority. This will improve user experience with less undesired interruptions, less missed important messages or calls, less need of manual parameter settings or priority list settings. Further, this also provides an optimized management of radio resources in the wireless communication device 140.

Figure 3:
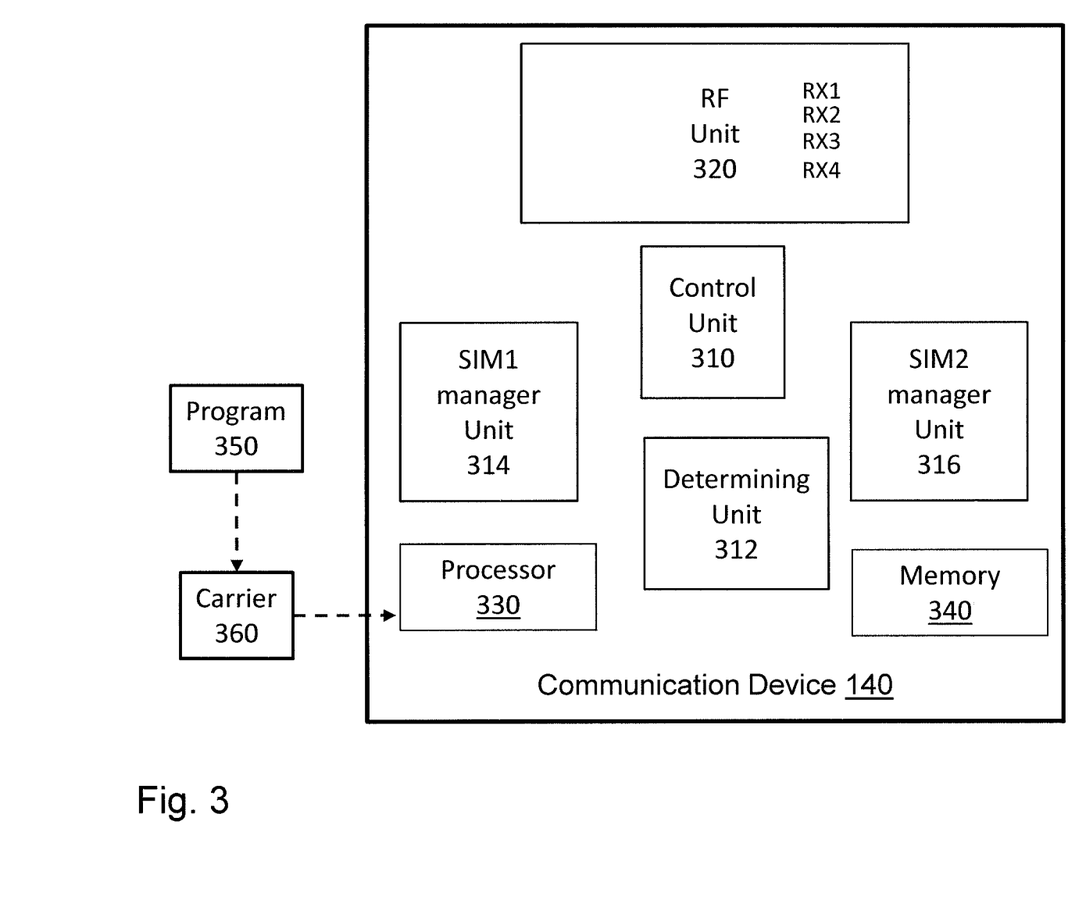
FIG. 3 is a schematic block diagram illustrating a wireless communication device according to embodiments herein.

To perform the method actions in the wireless communication device 140 for managing connection states in the wireless communication system 100 as described above in relation to FIG. 2, the wireless communication device 140 comprises the following circuits, units or modules depicted in FIG. 3. As mentioned above, the wireless communication system 100 comprises any one or more 2G, 3G, 4G or LTE, 5G networks, Wimax, WLAN or WiFi, Bluetooth, sensor networks etc. The wireless communication device 140 comprises multiple receiving paths and at least two Subscriber Identity Modules, SIMs. The first SIM1 is associated to a first original connection state towards the first network node 111. The second SIM2 is associated to a second original connection state towards the second network node 121.

The wireless communication device 140 may comprise, e.g. a control unit 310, a determining unit 312, a RF unit 320, a SIM1 manager unit 314, a SIM2 manager unit 316, etc. The RF unit 320 may represent any radio resources or radio interfaces, e.g. radio receivers or transmitters etc. for receiving and transmitting radio signals from/to network nodes. The RF unit 320 comprises multiple receiving paths RX1, RX2, RX3, RX4 as shown in FIG. 3.

According to the embodiments herein, the communication device 140 is configured to, e.g. by means of the control unit 310 being configured to, obtain a position of the wireless communication device 140.

The communication device 140 is further configured to, e.g. by means of the determining unit 312 being configured to, determine a priority list for the at least two SIMs based on the obtained position. The communication device 140 is further configured to determine whether the respective connection states of the first and second SIMs have conflicting needs in radio resources. When the respective connection states of the first and second SIMs have conflicting needs in radio resources, the communication device 140 is configured to, e.g. by means of the SIM1 manager unit 314 or the SIM2 manager unit 316 being configured to, perform a connection state change for the SIM that has lower priority from its original connection state to a third connection state.

According to some embodiments herein, the wireless communication device 140 may be configured to obtain a position based on any one of a GNSS position, a proximity detected by a proximity sensor, a position of a serving network node in a cellular network of the wireless communication system 100, or a position derived from triangulation using several network nodes.

According to some embodiments herein, the wireless communication device 140 may be configured to, e.g. by means of the control unit 310 being configured to, perform a connection state change for more than one SIMs according to the priority list for the SIMs.

According to some embodiments herein, the wireless communication device 140 may be configured to, e.g. by means of the control unit 310 being configured to, report the connection state change of the connection associated with the SIM to its associated network node.

Those skilled in the art will appreciate that the control unit 310, the determining unit 312, the SIM1 manager unit 314 and SIM2 manager unit 316 described above may be referred to one unit, a combination of analog and digital circuits, one or more processors, such as processor 330, depicted in FIG. 3, configured with software and/or firmware and/or any other digital hardware performing the function of each unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The wireless communication device 140 may further comprise a memory 340 comprising one or more memory units. The memory 340 is arranged to be used to store information, e.g. the priority list, CSI, CQI, RI and data, as well as configurations to perform the methods herein when being executed in the communication device 140.

The embodiments herein in the wireless communication device 140 for managing connection states in the wireless communication system 10, may be implemented through one or more processors, such as the processor 330 in the wireless communication device 140 together with computer program code 350 for performing the functions and actions of the embodiments herein. The program code mentioned above may also be provided as a computer program product, for instance in the form of a data carrier 360 carrying computer program code 350 for performing the embodiments herein when being loaded into the wireless communication device 140. One such carrier may be in the form of a CD ROM disc. It is however feasible with other data carriers such as a memory stick. The computer program code may furthermore be provided as pure program code on a server and downloaded to the wireless communication device 140.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed in a wireless communication device for managing connection states in a wireless communication system, wherein the wireless communication device comprises at least two Subscriber Identity Modules (SIMs) including a first SIM associated to a first original connection state towards a first network node and a second SIM associated to a second original connection state towards a second network node, the method comprising:
   obtaining a position of the wireless communication device;
   based on the obtained position, determining a higher-priority SIM and at least one lower-priority SIM of the at least two SIMs, wherein one of the first and second SIMs is the higher-priority SIM;
   determining whether the first and second original connection states associated with the first and second SIMs have conflicts between radio resources, of the wireless communication device, that are needed to receive signals from the first and second network nodes; and
   based on determining that the first and second original connection states have conflicts between the radio resources, performing a connection state change, for the lower-priority one of the first and second SIMs, from its original connection state to a third connection state.

2. The method according to claim 1, wherein the position is one of the following: a position in space; a position in time; and a position in both time and space.

3. The method according to claim 2, wherein obtaining a position in space comprises at least one of the following:
- determining a position from a Global Navigation Satellite System (GNSS);
- detecting a proximity by a proximity sensor;
- determining a position of a serving network node in a cellular network of the wireless communication system; and
- deriving a position based on triangulation using a plurality of network nodes.

4. The method according to claim 1, wherein the radio resources comprise at least one of the following: receiver branches; digital processing units; and dedicated hardware blocks comprised in the wireless communication device.

5. The method according to claim 1, wherein the connection state change for the lower-priority one of the first and second SIMs comprises any one of the following:
- from a higher active state to a lower active state;
- from an active state to an idle state;
- from an active state to a dormant state;
- from an idle state to a detached state;
- from a connection state that needs a full set of receive branches to a connection state that needs a subset of receive branches; and
- from a first radio access technology to a different second radio access technology.

6. The method according to claim 1, wherein the third state comprises any one of:
- a state with a de-activated component carrier;
- a state with a reduced Multi-Input-Multi-Output, MIMO, capability for the wireless communication device;
- a state in which the wireless communication device uses a less complex receiver type; and
- a state in which the wireless communication device uses a reduced number of iterations in iterative receivers.

7. The method according to claim 1, wherein determining a higher-priority SIM based on the obtained position comprises one or more of the following:
- determining the SIM associated with a job subscription to have higher priority during office hours;
- determining the SIM associated with a job subscription to have higher priority when the wireless communication device is at office position;
- determining the SIM associated with a job subscription to have higher priority when the wireless communication device is at a position other than home position;
- determining the SIM associated with a private subscription to have higher priority when the wireless communication device is at home position;
- determining the SIM associated with a private subscription to have higher priority when the wireless communication device is at a position other than office position;
- determining the SIM associated with a private subscription to have higher priority during non-office hours; and
- determining the SIM associated with a local subscription to have higher priority within one network area, whereas the SIM associated with a roaming subscription to have higher priority within another network area.

8. The method according to claim 1, further comprising performing the connection state change for more than one lower-priority SIM.

9. The method according to claim 1, further comprising reporting the performed connection state change to the network node, of the first and second network nodes, associated with the lower-priority one of the first and second SIMs.

10. A wireless communication device for managing connection states in a wireless communication system, wherein the wireless communication device comprises at least two Subscriber Identity Modules (SIMs) including a first SIM associated to a first original connection state towards a first network node and a second SIM associated to a second original connection state towards a second network node, the wireless communication device comprising:
- at least one processor; and
- at least one memory storing computer program code that, when executed by the at least one processor, configure the wireless communication device to:
  - obtain a position of the wireless communication device;
  - based on the obtained position, determine a higher-priority SIM and at least one lower-priority SIM of the at least two SIMs, wherein one of the first and second SIMs is the higher-priority SIM;
  - determine whether the first and second original connection states associated with the first and second SIMs have conflicts between radio resources, of the wireless communication device, that are needed to receive signals from the first and second network nodes; and
  - based on a determination that the first and second original connection states have conflicts between the radio resources, perform a connection state change, for the lower-priority one of the first and second SIMs, from its original connection state to a third connection state.

11. The wireless communication device according to claim 10, wherein the position is one of the following: a position in space; a position in time; and a position in both time and space.

12. The wireless communication device according to claim 10, wherein execution of the instructions configures the wireless communication device to obtain a position in space by at least one of the following:
- determining a position from a Global Navigation Satellite System (GNSS);
- detecting a proximity by a proximity sensor;
- determining a position of a serving network node in a cellular network of the wireless communication system; and
- deriving a position based on triangulation using a plurality of network nodes.

13. The wireless communication device according to claim 10, wherein the radio resources comprise at least one of the following: receiver branches; digital processing units; and dedicated hardware blocks comprised in the wireless communication device.

14. The wireless communication device according to claim 10, wherein the connection state change for the lower-priority one of the first and second SIMs comprises any one of the following:
- from a higher active state to a lower active state;
- from an active state to an idle state;
- from an active state to a dormant state
- from an idle state to a detached state;

from a connection state that needs a full set of receive branches to a connection state that needs a subset of receive branches; and from a first radio access technology to a different second radio access technology.

15. The wireless communication device according to claim 10, wherein the third state comprises any one of:
a state with a de-activated component carrier;
a state with a reduced Multi-Input-Multi-Output, MIMO, capability for the wireless communication device;
a state in which the wireless communication device uses a less complex receiver type; and
a state in which the wireless communication device uses a reduced number of iterations in iterative receivers.

16. The wireless communication device according to claim 10, wherein execution of the instructions configures the wireless communication device to determine a higher-priority SIM based on the obtained position according to one or more of the following:
determining the SIM associated with a job subscription to have higher priority during office hours;
determining the SIM associated with a job subscription to have higher priority when the wireless communication device is at office position;
determining the SIM associated with a job subscription to have higher priority when the wireless communication device is at a position other than home position;
determining the SIM associated with a private subscription to have higher priority when the wireless communication device is at home position;
determining the SIM associated with a private subscription to have higher priority when the wireless communication device is at a position other than office position;
determining the SIM associated with a private subscription to have higher priority during non-office hours; and
determining the SIM associated with a local subscription to have higher priority within one network area, whereas the SIM associated with a roaming subscription to have higher priority within another network area.

17. The wireless communication device according to claim 10, wherein execution of the instructions further configures the wireless communication device to perform the connection state change for more than one lower-priority SIM.

18. The wireless communication device according to claim 10, wherein execution of the instructions further configures the wireless communication device to report the connection state change to the network node, of the first and second network nodes, associated with the lower-priority one of the first and second SIMs.

19. A non-transitory, computer-readable medium storing computer program code that, when executed by a processor comprising a wireless communication device, configures the wireless communication device to perform operations corresponding to the method of claim 1.

* * * * *